United States Patent [19]

Beuker et al.

[11] Patent Number: 5,416,644
[45] Date of Patent: May 16, 1995

[54] DEVICE FOR PROCESSING AN INTERLACED FRAME SIGNAL FOR DISPLAY ON A TELEVISION DISPLAY WHEN THE SIGNAL IS APPLIED TO THE DEVICE IN A REVERSE SEQUENCE

[75] Inventors: Rob A. Beuker; Imran A. Shah, both of Eindhoven, Netherlands

[73] Assignee: U.S. Philips Corporation, New York, N.Y.

[21] Appl. No.: 97,644

[22] Filed: Jul. 26, 1993

[30] Foreign Application Priority Data

Jul. 30, 1992 [EP] European Pat. Off. ............ 92202367

[51] Int. Cl.$^6$ ............................................. H04N 5/78
[52] U.S. Cl. ................................. 360/33.1; 360/61; 358/335
[58] Field of Search .................. 360/33.1, 22, 61; 358/335; 348/441, 397, 398, 438

[56] References Cited

U.S. PATENT DOCUMENTS

| | | | |
|---|---|---|---|
| 4,868,654 | 9/1989 | Juri et al. | 358/133 |
| 4,947,243 | 8/1990 | Wendland et al. | 358/31 |
| 5,097,331 | 3/1992 | Chen et al. | 358/138 |
| 5,101,273 | 3/1992 | Gillies et al. | 358/140 |
| 5,115,309 | 5/1992 | Hang | 358/133 |
| 5,136,385 | 8/1992 | Campbell | 348/607 |
| 5,166,788 | 11/1992 | Lee | 358/105 |
| 5,239,377 | 8/1993 | Shah et al. | 348/441 X |

*Primary Examiner*—Andrew L. Sniezek
*Attorney, Agent, or Firm*—Edward W. Goodman

[57] ABSTRACT

Device for splitting an interlaced television frame into a vertical low-frequency spatial signal and a vertical high-frequency motion auxiliary signal. In a forward play mode the two signals are added together. In a reverse play mode, in which the frames are supplied in the reverse order, the motion auxiliary signal is subtracted from the spatial signal.

4 Claims, 2 Drawing Sheets

DEVICE FOR PROCESSING AN INTERLACED FRAME SIGNAL FOR DISPLAY ON A TELEVISION DISPLAY WHEN THE SIGNAL IS APPLIED TO THE DEVICE IN A REVERSE SEQUENCE

BACKGROUND OF THE INVENTION

1. Field of the Invention

The invention relates to a device for processing an interlaced frame signal for display on a television display when the interlaced frame signal is applied to the device in a reverse sequence. Such a device is used in video players having a reverse play facility. The invention also relates to a video player comprising such a device. Such a player may be, for example a video recorder or a CD video player.

2. Description of the Related Art

Video players generally have a reverse play facility with which the recorded video scene is displayed in reverse. In the current video recorders, the frame signal is recorded as a succession of fields which pair-wise form an interlaced frame. These types of apparatus are referred to as "field-based" video recorders. In the reverse play mode of such field-based video recorders the fields are read and displayed in the reverse order.

For a novel generation of digital video recorders, storage and signal processing of complete interlaced frames of the frame signal are considered. These "frame-based" video recorders necessarily comprise a circuit for successively displaying the even and the odd field of each interlaced frame. In the reverse play mode, in which the frames are read from the tape in the reverse order, the two fields of each frame should be displayed in the reverse order. In fact, the two fields of a frame are obtained at different instants. If their order were not reversed, the frame signal would be subject to motion artefacts. Moving pictures would not be displayed smoothly but jerkily.

SUMMARY OF THE INVENTION

It is an object of the invention to provide a device with which the direction of motion within an interlaced television frame is reversed.

To this end the device according to the invention comprises means for splitting the interlaced frame signal into a spatial signal comprising the lowest vertical frame frequencies, and a motion auxiliary signal comprising the highest vertical frame frequencies, and means for subtracting the motion auxiliary signal from the spatial signal. Reverse play is now found to be realized smoothly and without any noticeable motion artifacts. The device has a simple construction and the sequence of displaying the fields of each frame is the same as in the case of forward play.

The split-up of an interlaced frame signal into a spatial signal and a motion auxiliary signal has been previously proposed in the non-prepublished European Patent Application no. EP 0 520 546 corresponding to U.S. Pat. No. 5,239,377. It has been explained in this Application that the spatial signal represents the spatial picture contents and that addition of the motion auxiliary signal to this frame reconstructs the motion in the frame. It has been found that subtraction of the motion auxiliary signal from the spatial signal causes a reversal of the direction of motion. Said Patent Application also states that the two signals combined need not comprise the full vertical frequency spectrum. The bandwidth of the spatial signal closely relates to the desired frame resolution, and a narrow-band motion auxiliary signal is sufficient for reconstructing the motion. This also applies to the reversal of motion for reverse play.

The means for splitting the interlaced frame signal into a spatial signal and a motion auxiliary signal may be constituted by a vertical low-pass filter and a vertical high-pass filter, respectively. However, the invention is notably suitable in situations where the frame signal has already been split before recording. The spatial signal and the motion auxiliary signal have then been recorded separately. Upon display, they only need to be separated, for example by means of a demultiplex circuit.

DESCRIPTION OF THE PREFERRED EMBODIMENT

Figure 1:
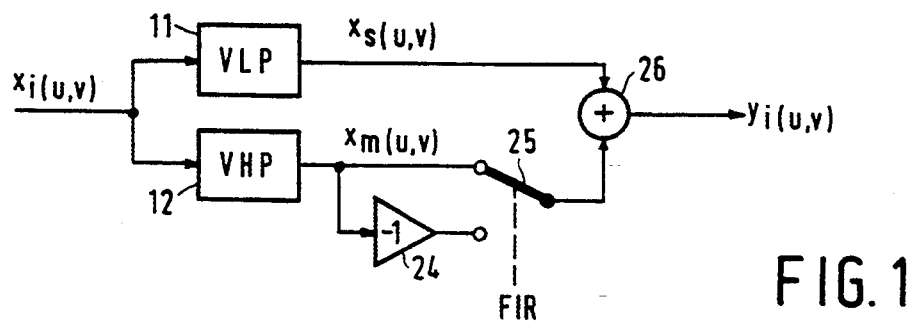
FIG. 1 shows diagrammatically a device according to the invention.

FIG. 1 shows, diagrammatically, a device according to the invention. The device comprises a vertical low-pass filter 11 and a vertical high-pass filter 12. An interlaced frame signal, in the form of digital frame samples $x_i(u,v)$, is applied to the device. The low pass filter 11 supplies a spatial signal $x_s(u,v)$. The high-pass filter 12 supplies a motion auxiliary signal $x_m(u,v)$. The motion auxiliary signal $x_m(u,v)$ is applied to a selector switch 25, either directly or via an inverter 24. Dependent on the position of the selector switch 25, the direct motion auxiliary signal $x_m(u,v)$ or the inverted motion auxiliary signal $-x_m(u,v)$ is added to the spatial signal $x_s(u,v)$ in an adder circuit 26. The adder circuit 26 supplies an interlaced output signal $y_i(u,v)$. The selector switch 25 is controlled by a forward/reverse operating signal F/R. For normal forward play, the selector switch is in the position shown. The motion auxiliary signal $x_m(u,v)$ and the spatial signal $x_s(u,v)$ are then added together. In the reverse play mode, the selector switch is in the other position. In this mode the motion auxiliary signal $x_m(u,v)$ is subtracted from the spatial signal $x_s(u,v)$.

Figure 3A:
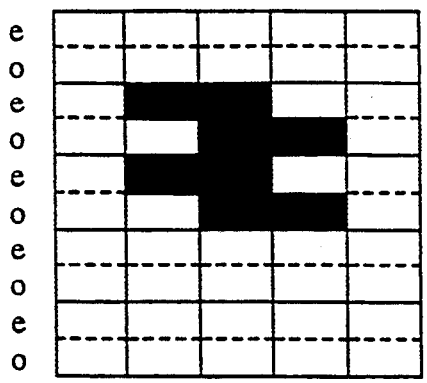
FIGS. 3A-3H show some diagrams to explain the device of FIG. 1.
Figure 3B:
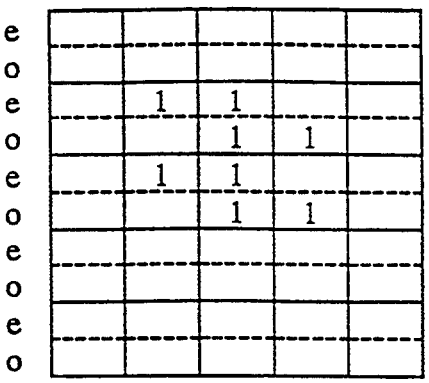

The device shown in FIG. 1 will be described with reference to an input signal having the shape of a rectangular frame area of 2 pixels wide and 4 TV lines high. The rectangle moves to the right at a rate of one pixel period per field. In FIG. 3A this interlaced frame is shown graphically. Due to the motion, the pixels in the second, odd field are moved to the right over one sample period. FIG. 3B shows the pixel values $x_i(u,v)$ corresponding to the frame. The pixels constituting the frame area have the value of 1 and the pixels constituting the background have the value of 0 (not shown).

As described in Patent Application EP 0 520 546 (U.S. Pat. No. 5,239,377), the interlaced input signal can be considered as the sum of a baseband component, having a spectrum around the vertical frequency $\Omega_y=0$, and an alias component around the vertical frequency $\Omega_y=\pi$. Here, $\Omega_y=\pi$ is the highest vertical frequency, or half the sample frequency. The low-pass filter 11 (see FIG. 1) filters the baseband component from the input signal and supplies the spatial frame signal $x_s(u,v)$ which represents the spatial contents of the frame. The high-pass filter 12 (see FIG. 1) filters the alias component from the input signal and supplies the motion auxiliary signal or "motion helper" $x_m(u,v)$ which is representative of the motion in the frame signal. If desired, the motion auxiliary signal may have a narrow band.

Figure 2A:
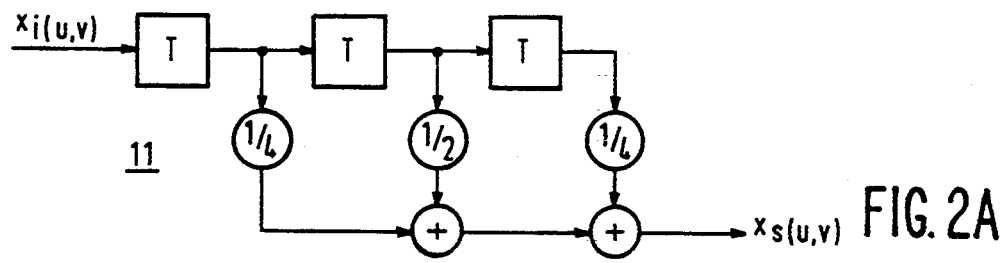
FIGS. 2A and 2B show embodiments of filters shown in FIG. 1.
Figure 2B:
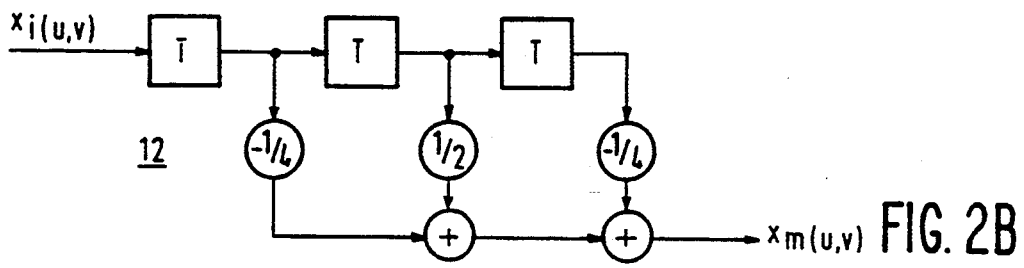
Figure 3C:
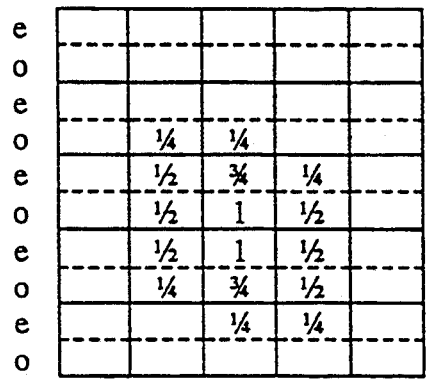
Figure 3D:
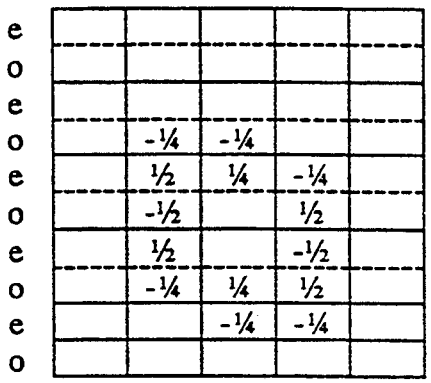

It will hereinafter be further assumed that the filters shown in FIGS. 2A and 2B are used in the device shown in FIG. 1. The vertical low-pass filter 11 (see FIG. 2A) with filter coefficients $\frac{1}{4}$, $\frac{1}{2}$ and $\frac{1}{4}$ has a cut-off frequency $\Omega_y = \frac{1}{2}\pi$. The vertical high-pass filter 12 (see FIG. 2B) has filter coefficients $-\frac{1}{4}$, $\frac{1}{2}$ and $-\frac{1}{4}$ and also has a limit frequency $\Omega_y = \frac{1}{2}\pi$. For these filters, FIG. 3C shows the pixel values of the spatial signal $x_s(u,v)$ and FIG. 3D shows the pixel values of the motion auxiliary signal $x_m(u,v)$.

Figure 3E:
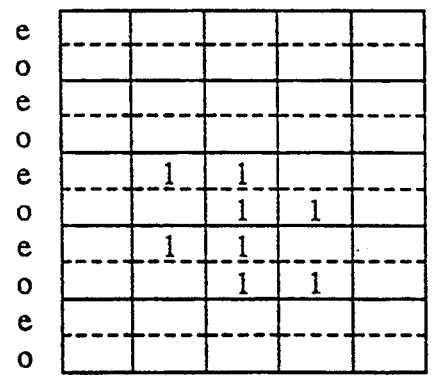
Figure 3F:
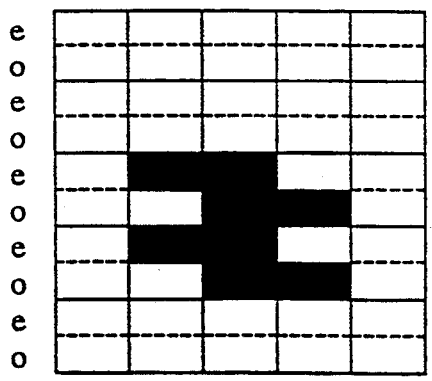

In the case of forward play, the motion auxiliary signal $x_m(u,v)$ is added to the spatial signal $x_s(u,v)$. The pixel values of the output signal $y_i(u,v)$ are shown in FIG. 3E. They have been obtained by adding the pixel values in FIG. 3C and FIG. 3D together. In FIG. 3F, the obtained interlaced frame is shown graphically. As is apparent therefrom, the rectangle is displayed correctly. Due to the delay in the filters the rectangle is shifted only slightly downwards. Assuming that first the even field and subsequently the odd field of each frame is displayed, it appears from FIG. 3F that the frame area moves to the right. This is in full conformity with the original video scene.

Figure 3G:
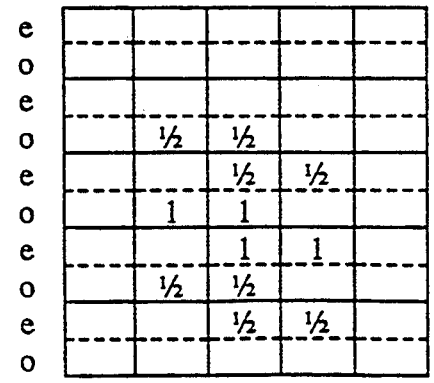
Figure 3H:
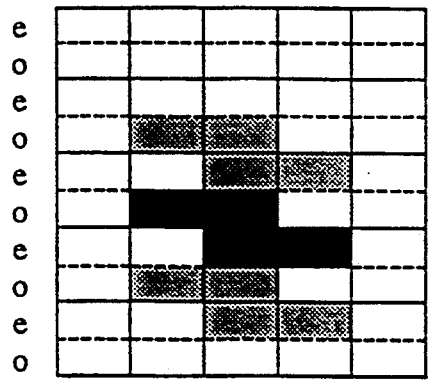

In the case of reverse play, the motion auxiliary signal $x_m(u,v)$ is subtracted from the spatial signal $x_s(u,v)$. The pixel values of the output signal $y_i(u,v)$ are shown in FIG. 3G. Now they have been obtained by subtracting the pixel values in FIG. 3D from the corresponding pixel values in FIG. 3C. FIG. 3H shows the interlaced frame graphically. With an unchanged sequence of displaying the fields (first the even field, then the odd field), it appears from FIG. 3H that the odd field has shifted to the left over one sample period. Consequently, the frame area now moves in the opposite direction.

As is further apparent from FIG. 3H, the resolution of the frame upon reverse play is slightly reduced in the example considered. This is caused by the following fact. For the sake of simplicity of the example, a frame area having extremely steep vertical transitions has been chosen as an input signal. Consequently the spectra of the baseband component and the alias component overlap each other for the greater part and an unambiguous split-up of the components is not possible. Moreover, also for the sake of simplicity, two non-optimal filters are used. In practical situations the reverse frame signal is not subject to degradation of the frame quality.

Figure 4:
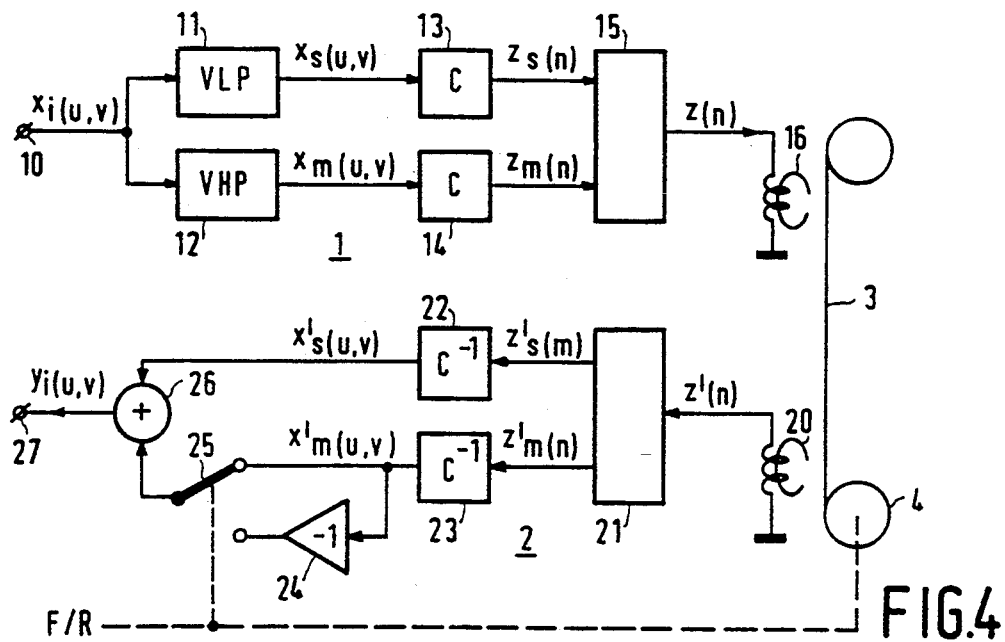
FIG. 4 shows a video recorder provided with a device according to the invention.

FIG. 4 shows diagrammatically a video recorder including a device according to the invention. In this Figure, elements having the same reference numerals denote the same components as in FIG. 1. The video recorder comprises a recording section and a playback section 2. Both sections are coupled to a storage medium 3, for example a magnetic tape. The tape 3 is transported by means of a transport device 4.

The interlaced frame signal $x_i(u,v)$ is applied to an input 10 of the recording section. The interlaced frame signal is applied to the vertical low-pass filter 11 and the vertical high-pass filter 12. The spatial signal $x_s(u,v)$ and the motion auxiliary signal $x_m(u,v)$ are subjected in respective coding circuits 13 and 14 to some coding operation and converted into digital bit streams $z_s(n)$ and $z_m(n)$, respectively. The bit streams are applied to a multiplexer 15 which applies a resultant channel bit stream $z(n)$ to a recording head 16.

A reproducing head 20 reads the recorded signal. The channel bit stream $z'(n)$ which has been read is split into digital bit streams $z'_s(n)$ and $z'_m(n)$ in a demultiplexer 21. Decoding circuits 22 and 23 perform decoding operations which are inverse to the coding operations performed by the coding circuits 13 and 14. Thus, upon play-back, the spatial signal $x'_s(u,v)$ and the motion auxiliary signal $x'_m(u,v)$ are regained. They are applied in a manner already described to the inverter 24, the selector switch 25 and the adder circuit 26. The adder circuit 26 applies the interlaced output signal $y_i(u,v)$ to an output 27 of the video recorder. The selector switch 25 is controlled by a forward/reverse operating signal F/R which also controls the transport device 4. In the normal forward direction of the tape the selector switch 25 is in the position shown. In the reverse play mode of the video recorder the tape direction is reversed and the selector switch 25 is in the other position.

We claim:

1. A video reproducing apparatus, for playing back an interlaced frame signal, said apparatus comprising a playback section, a storage medium coupled to an input of said playback section, and transport means for transporting said storage medium in a forward and a reverse direction, characterized in that said playback section comprises means for splitting said interlaced frame signal into a spatial signal comprising the lowest vertical frame frequencies, and a motion auxiliary signal comprising the highest vertical frame frequencies, and means for subtracting the motion auxiliary signal from the spatial signal when said transport means transports said storage medium in the reverse direction.

2. A video reproducing apparatus as claimed in claim 1, characterized in that the means for splitting the interlaced frame signal into the spatial signal and the motion auxiliary signal are constituted by a vertical low-pass filter and a vertical high-pass filter, respectively.

3. A video reproducing apparatus as claimed in claim 1, characterized in that the means for splitting the interlaced frame signal are constituted by separating means for separating a recorded spatial signal and a motion auxiliary signal.

4. A video reproducing apparatus comprising a storage medium for storing a resultant channel bit stream, said resultant channel bit stream being formed by vertical low-pass filtering an interlaced frame signal thereby forming a spatial signal, coding and digitizing said spatial signal thereby forming a first digital bit stream, vertical high-pass filtering said interlaced frame signal thereby forming a motion auxiliary signal, coding and digitizing said motion auxiliary signal thereby forming a second digital bit stream, and multiplexing said first and second digital bit streams thereby forming said resultant channel bit stream; transport means for transporting said storage medium in a forward and a reverse direction; and a playback section comprising an input terminal coupled to said storage medium for playing back the resultant channel bit stream recorded on the storage medium, a demultiplexer having an input coupled to the input terminal of said playback section and a first and a second output, a first decoding circuit having an input coupled to the first output of said demultiplexer, said first decoding circuit performing a decoding operation inverse to the coding operation performed on said spatial signal and supplying at an output a reconstituted spatial signal, a second decoding circuit having an input coupled to the second output of said demultiplexer, said second decoding circuit performing a decoding operation inverse to the coding operation performed on said motion auxiliary signal and supplying at an output a reconstituted motion auxiliary signal, an inverting circuit having an input coupled to the output of said second decoding circuit, switching means having a first input also coupled to the output of said second decoding circuit, and a second input coupled to an output of said inverting circuit, an adder circuit having a first input coupled to the output of said first decoding circuit and a second input coupled to an output terminal of said switching means, an output of said adder circuit being coupled to an output terminal of said playback section, and means coupled to said transport means and said switching means for connecting the first input of the switching means to the output when the transport means is transporting said storage medium in the forward direction, and for connecting the second input of the switching means to the output when the transport means is transporting said storage medium in the reverse direction.

* * * * *